(12) United States Patent
Gorbounov et al.

(10) Patent No.: US 8,922,074 B2
(45) Date of Patent: Dec. 30, 2014

(54) ELEVATOR MACHINE MOTOR AND DRIVE AND COOLING THEREOF

(75) Inventors: Mikhail B. Gorbounov, South Windsor, CT (US); Zbigniew Piech, Cheshire, CT (US); Vladimir Blasko, Avon, CT (US); Daryl J. Marvin, Farmington, CT (US); William A. Veronesi, Hartford, CT (US); Igor I. Fedchenia, West Hartford, CT (US); Jinliang Wang, Ellington, CT (US)

(73) Assignee: Otis Elevator Company, Farmington, CT (US)

( * ) Notice: Subject to any disclaimer, the term of this patent is extended or adjusted under 35 U.S.C. 154(b) by 453 days.

(21) Appl. No.: 12/797,776

(22) Filed: Jun. 10, 2010

(65) Prior Publication Data

US 2010/0288586 A1 Nov. 18, 2010

Related U.S. Application Data

(63) Continuation of application No. PCT/US2008/013525, filed on Dec. 9, 2008, which is a continuation-in-part of application No. PCT/US2007/086903, filed on Dec. 10, 2007.

(60) Provisional application No. 61/131,483, filed on Jun. 9, 2008.

(51) Int. Cl.
   *H02K 9/19* (2006.01)
   *F28D 15/02* (2006.01)
   *B66B 11/04* (2006.01)

(52) U.S. Cl.
   CPC ........ *B66B 11/0438* (2013.01); *F28D 15/0275* (2013.01)

USPC ................................ 310/54; 310/52; 165/185

(58) Field of Classification Search
   CPC ........ F28D 15/0275; H02K 9/19; H02K 9/20; B66B 11/0438
   USPC .................... 310/54, 52, 64; 165/104.26, 185
   See application file for complete search history.

(56) References Cited

U.S. PATENT DOCUMENTS

| | | | |
|---|---|---|---|
| 5,763,951 A | 6/1998 | Hamilton | |
| 6,102,110 A * | 8/2000 | Julien et al. | 165/104.33 |

(Continued)

FOREIGN PATENT DOCUMENTS

| | | |
|---|---|---|
| CN | 1284928 A | 2/2001 |
| CN | 1792018 A | 6/2006 |

(Continued)

OTHER PUBLICATIONS

Translation of foreign document FR 2861913.*

(Continued)

*Primary Examiner* — Alex W Mok
(74) *Attorney, Agent, or Firm* — Cantor Colburn LLP

(57) ABSTRACT

Heat in a drive system including a motor and a drive is removed using heat pipes in heat exchanging contact with the motor and the drive. The heat conducting element have at least one portion for receiving heat from the motor or the drive, and another portion to transfer heat to a heat exchange device that is spaced from the motor and drive. The heat conducting element may be a heat pipe or a heat spreader element.

6 Claims, 17 Drawing Sheets

(56) References Cited

U.S. PATENT DOCUMENTS

| | | | |
|---|---|---|---|
| 6,830,098 B1 * | 12/2004 | Todd et al. | 165/104.33 |
| 7,049,716 B2 | 5/2006 | Grundle et al. | |
| 7,117,930 B2 * | 10/2006 | Todd et al. | 165/104.21 |
| 7,378,766 B2 | 5/2008 | Vasilescu et al. | |
| 7,931,073 B2 * | 4/2011 | Gorbounov et al. | 165/174 |
| 2004/0164625 A1 * | 8/2004 | Grundl et al. | 310/16 |
| 2008/0067882 A1 | 3/2008 | Murata | |

FOREIGN PATENT DOCUMENTS

| | | |
|---|---|---|
| CN | 101145712 A | 3/2008 |
| EP | 0 631 967 A2 | 1/1995 |
| EP | 0711025 A | 5/1996 |
| EP | 0901980 A | 3/1999 |
| EP | 1057768 | 12/2000 |
| EP | 1368882 B1 | 2/2005 |
| FR | 2861913 A1 * | 5/2005 |
| GB | 410425 | 5/1933 |
| GB | 900852 | 7/1962 |
| JP | 2007197094 A | 8/2007 |
| WO | WO00/38488 | 6/2000 |
| WO | WO02075901 A | 9/2002 |
| WO | WO02103883 A | 12/2002 |
| WO | WO 03/043727 | 5/2003 |
| WO | 2005043727 A1 | 5/2005 |
| WO | WO 2006083435 A2 * | 8/2006 |
| WO | WO 2006083446 A2 * | 8/2006 |
| WO | WO 2007073368 A1 * | 6/2007 |

OTHER PUBLICATIONS

International Search Report, mailed Jan. 15, 2009.
European Search Report, mailed May 10, 2011.
European Office Action, mailed Apr. 30, 2012.
Japanese Office Action, mailed Jul. 10, 2012.
The Chinese First Office Action for Chinese Patent Application No. 200980121440 dated Oct. 26, 2012.
English Translation of Chinese Second Office Action, mailed May 31, 2013.
English Translation of Chinese Search Report, dated May 22, 2013.
English Translation of Third Chinese Office Action, issued Nov. 28, 2013.

* cited by examiner

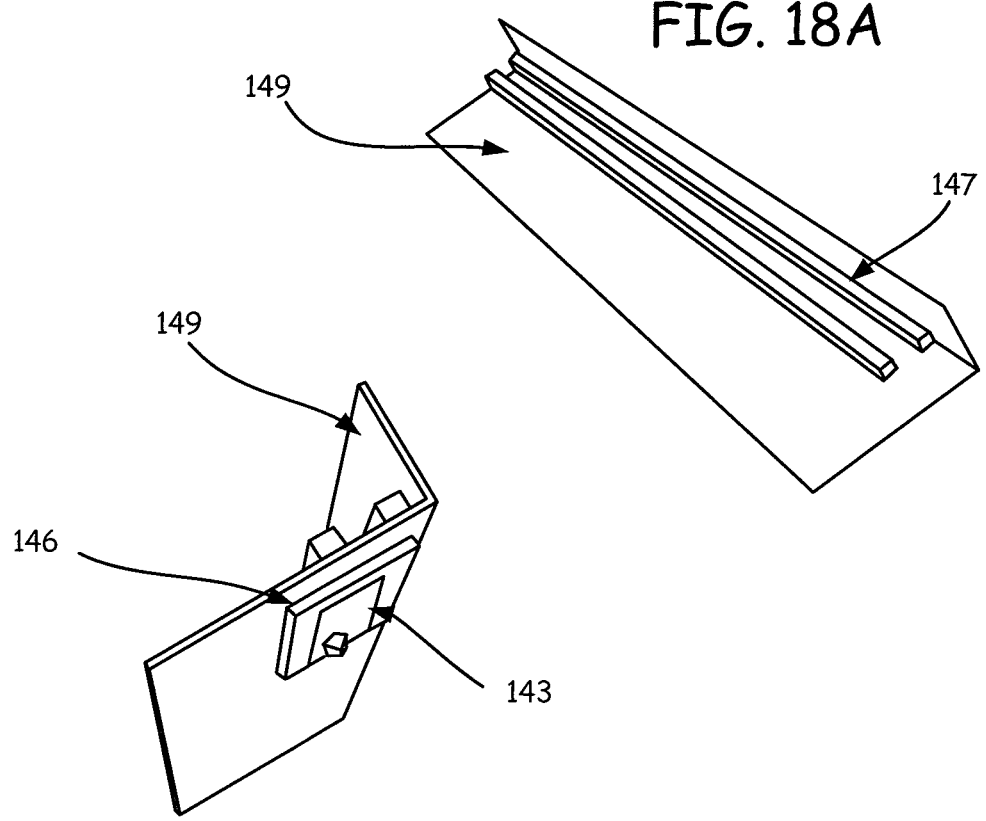

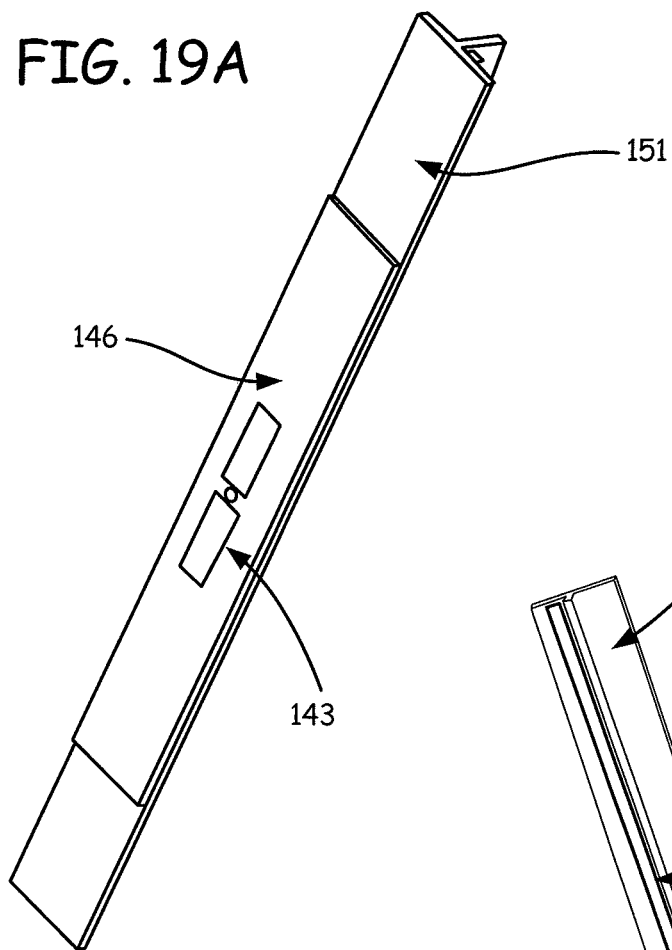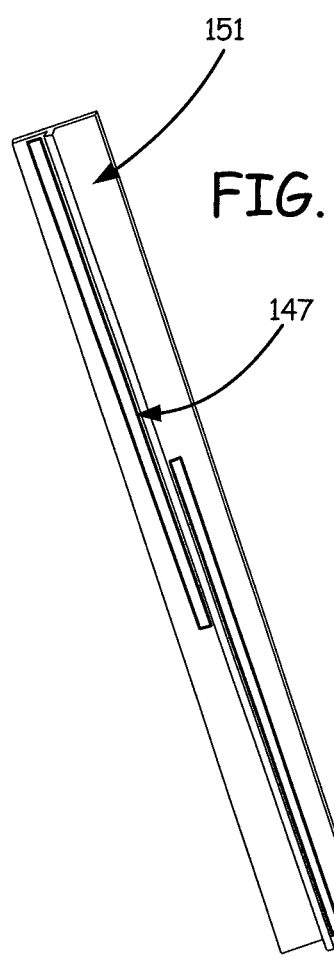

ELEVATOR MACHINE MOTOR AND DRIVE AND COOLING THEREOF

CROSS-REFERENCE TO RELATED APPLICATION(S)

This U.S. application is a continuation-in-part and claims priority from U.S. Provisional Application No. 61/131,483, filed Jun. 9, 2008 and from PCT Application PCT/US07/086903, filed Dec. 10, 2007 and PCT Application PCT/US08/013525, filed Jan. 15, 2009, the disclosure of which is incorporated herein by reference in its entirety.

BACKGROUND

Elevator systems typically include an elevator car that is supported for movement within a hoistway. The elevator car travels between different levels of a building, for example, to transport passengers, cargo or both to desired destinations. An elevator machine causes the desired movement of the car.

Many elevator machines include a motor that rotates a traction sheave to cause movement of a roping arrangement (e.g., round ropes or flat belts) from which the elevator car is suspended. The machine includes a drive that provides power and control signals to the motor to achieve the desired elevator car movement.

Typical arrangements include separated motors and drives. Hardwired connections between them facilitate achieving the desired motor operation based upon the control signals provided by the drive. One issue with traditional arrangements is that the amount of wiring required between the drive and the motor introduces additional expense and complexity when installing or repairing an elevator machine. Another issue that is common to most drives is that some arrangement must be provided for cooling the electronics of the drive.

One attempt at changing an elevator drive arrangement is shown in WO 2005/040024. That document describes a proposed separation of drive components with an inverter integrated with a motor.

The increasing market demand for lower cost, high space utilization, energy efficiency, and low noise environment of modern buildings translates into miniaturization and high power density, low noise and energy efficiency requirements for elevators, their motors and their electronic drives. One of the key factors determining acceptable power density in the motor and in the drive is the thermal management or cooling system.

The cooling system of the motor is typically based on heat removal through the natural convection to surrounding air from the surface of the motor, which in many cases determines the motor size. Modern elevators usually employ permanent magnet motors with a brushless rotor so that only the stator has a winding. Resistive losses present the source of heat that needs to be removed. The typical brake in an elevator system also has at least one electromagnetic coil with associated resistive losses, and often represents the second largest heat source in the system. Additionally, the efficiency of bearings is limited by mechanical friction and aerodynamic and hydrodynamic drag, and thus the bearings contribute additional heat to the machine.

Motor drive cooling systems usually include fans for forced air circulation and removal of the heat that results primarily from power dissipation of power electronic components. The heat sources are connected to a heat sink and fans are forced air circulation is used to move heat from the heat sink to the ambient environment. Typically heat sinks are costly and take up significant space. Fans contribute to noise, reduce drive reliability and increase maintenance costs. It is desirable, therefore, to eliminate fans or, at least, reduce the size or number of fans. An alternative to using fans has been to provide an extended surface inside or outside of the drive enclosure and use natural convection mechanisms.

Liquid cooling, though not as common as direct forced air cooling, is also applied in some cases to power electronics. In such a system, the high heat flux of the power electronics components is absorbed by a moving liquid and carried to a remote liquid-to-air heat exchanger. While liquid cooling systems can provide for a more compact power electronics section, the size of a remote heat exchange must be similar or even larger than required by a forced air flow system.

An exemplary elevator machine includes a motor having a case. A drive provides power and control signals to the motor. The drive is supported adjacent the motor case such that the drive and the motor are at the same location.

SUMMARY

The present invention is an apparatus and method for reducing heat in a drive system having a motor and a drive providing a source of power for the motor, and for other components in the system, without the use of fans and other devices that increase cost, consume energy, produce noise and reduce reliability.

The apparatus includes at least one passive heat conducting element in heat exchanging contact with the motor or the drive. The heat conducting element includes at least one portion for receiving heat from the motor or the drive, and a second portion for each heat conducting element for receiving heat transferred from the first portion. A heat exchange device is used for withdrawing heat from the second portion to cool the motor and/or drive.

The heat conducting element may be a heat pipe or a heat spreader, or a combination of both devices.

The heat exchange device may be a conventional heat exchanger or it may be configured such that a portion of the structural elements of the elevator system are adapted to exchange heat from the heat conducting element second portion at a location spaced from the motor and the drive.

The motor and drive may be separated from each other and connected in a conventional manner such that at least one of the motor and the drive have at least one heat pipe in heat exchanging contact therewith. Alternatively, the motor and the drive are integrated to provide a single external surface for contact with the at least one heat pipe.

BRIEF DESCRIPTION OF THE DRAWINGS

FIGS. 18A and 18B show another variation of the embodiment of FIG. 16.

FIGS. 19A and 19B show yet another variation of the embodiment of FIG. 16.

DETAILED DESCRIPTION

Figure 1:
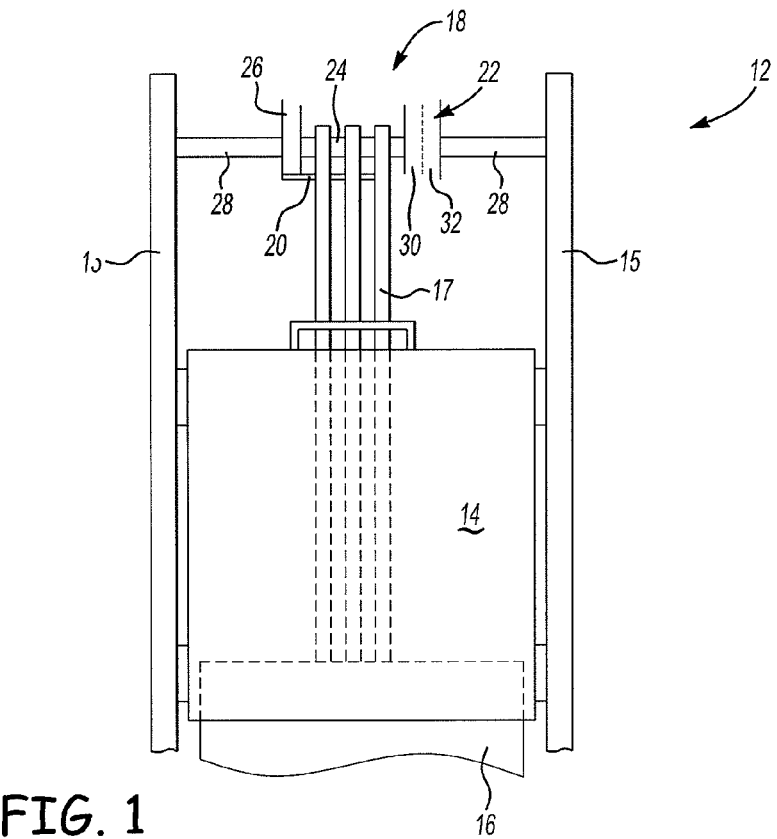
FIG. 1 schematically shows selected portions of an elevator system including an exemplary elevator machine assembly.

FIG. 1 schematically shows selected portions of an elevator system 12. An elevator car 14 is supported for movement along guide rails 15. A counterweight 16 is coupled with the car 14 using a roping arrangement (e.g., round ropes or flat belts) 17 in a known manner. An elevator machine assembly 18 includes a frame 20 that supports a motor and drive portion 22, a traction sheave 24 and a brake portion 26. The frame 20 is supported on a structural member 28, which in this example is connected with the guide rail 16.

One feature of the illustrated example is that the motor and drive portion 22 includes a motor 30 and a drive 32 at the same location. The drive 32 provides power and control signals to the motor 30. Having the motor 30 and drive 32 at the same location is different than previous arrangements where the drive and motor were at separate locations.

Figure 2:
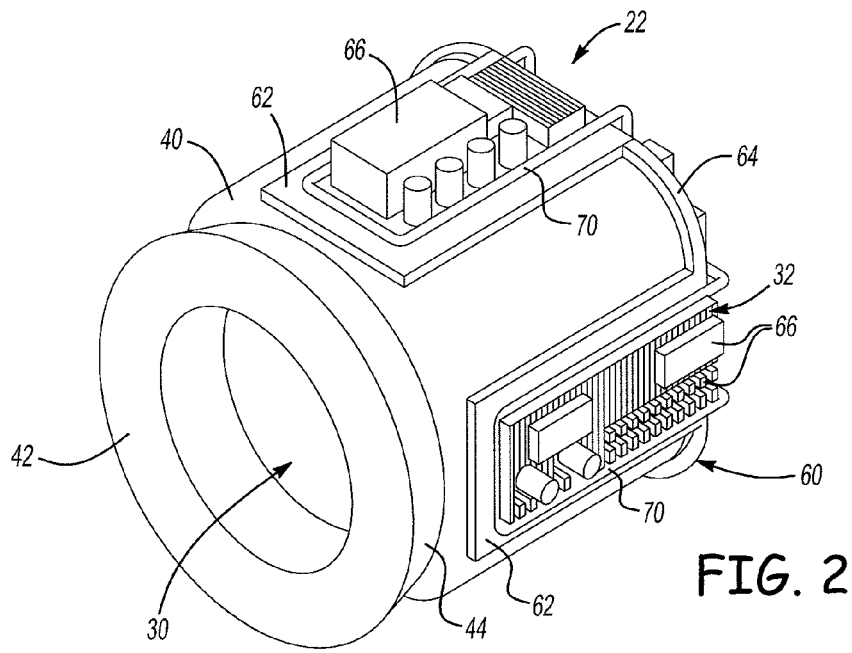
FIG. 2 is a perspective illustration diagrammatically illustrating one example embodiment of selected portions of an elevator machine assembly.
Figure 3:
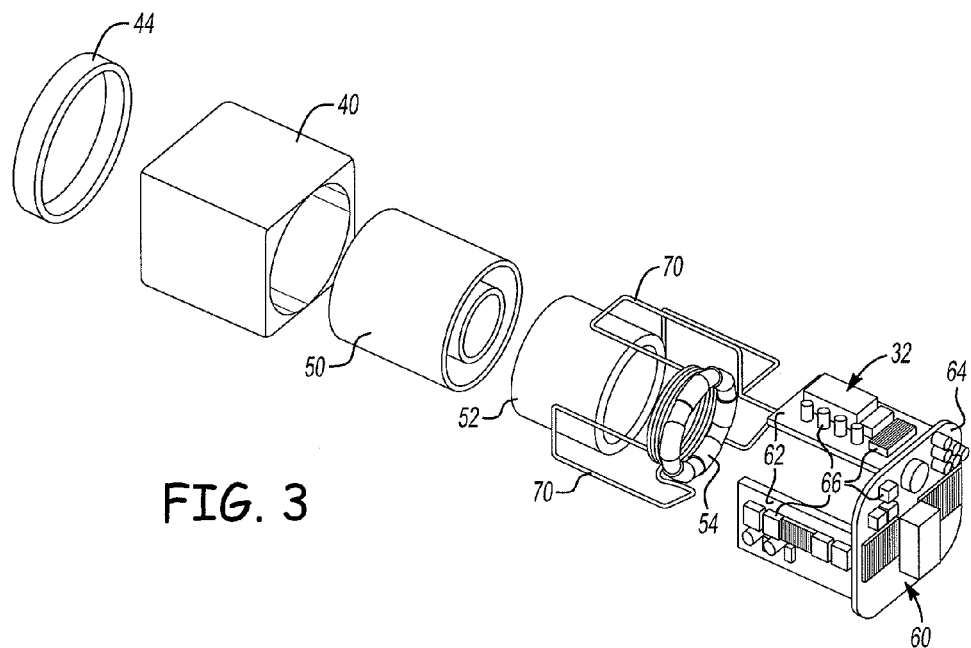
FIG. 3 is an exploded, perspective illustration of the example of FIG. 2.

Referring to FIGS. 2 and 3, one example motor 30 includes a motor case 40 that houses components of the motor 30. In this example, at least one capacitor component 44 is provided near one end of the case 40. In one example the capacitor component 44 comprises an electrode of the capacitor. The illustrated example allows for the capacitor component 44 to be supported between the motor case 40 and a support plate of a machine frame, for example.

Example components within the case 40 include a rotor 50, a stator 52 and a choke 54. Incorporating the choke 54 into the motor structure is different than previous motor designs. In this example, the choke 54 comprises a line inductor that includes part of the motor core with wire to establish a line inductor. Incorporating the choke into the motor structure avoids having the choke as a stand alone component. This represents space savings and reduces installation time as the number of stand alone components of an elevator machine assembly has an impact on the complexity of the system and the time required for installation, for example.

In this example, the drive 32 includes a support structure 60 comprising a plurality of boards 62. In one example, the boards 62 comprise printed circuit board substrate materials. The illustrated example includes an end cap board 64 from which each of the boards 62 extends. Each of the boards 62 and 64 support a plurality of electronic components 66. Power control and control signal generation for operating the motor 30 are accomplished by the electronic components 66.

In the illustrated example, the drive support structure 60 is positioned adjacent the motor case 40. In this particular example, at least one of the boards 62, 64 is received immediately against the motor case 40 such that the drive 32 is supported by the motor case 40. This is one example arrangement that allows for locating the motor 30 and drive 32 at the same location.

Another feature of the illustrated example is a cooling circuit 70 that provides cooling to at least the drive 32. In this example, the cooling circuit 70 includes an electroconductive fluid that follows a closed loop conduit path that is positioned relative to the electronic components 66 of the drive 32 to dissipate heat and provide cooling for the component 66. The conduit for the cooling circuit 70 follows a path around and between at least some drive components in close enough proximity for the fluid to absorb some heat from the drive components. In this example, the electroconductive fluid effectively gets pumped through the cooling circuit 70 by the electric field of the motor 30. As the fluid flows, it carries heat away from the drive components to provide cooling.

One feature of such an arrangement is that the cooling for the drive 32 operates responsive to operation of the motor 30. No separate source of power for cooling the drive 32 is required. The illustrated example takes advantage of operation of the motor 30 to provide cooling to the drive 32.

Figure 4:
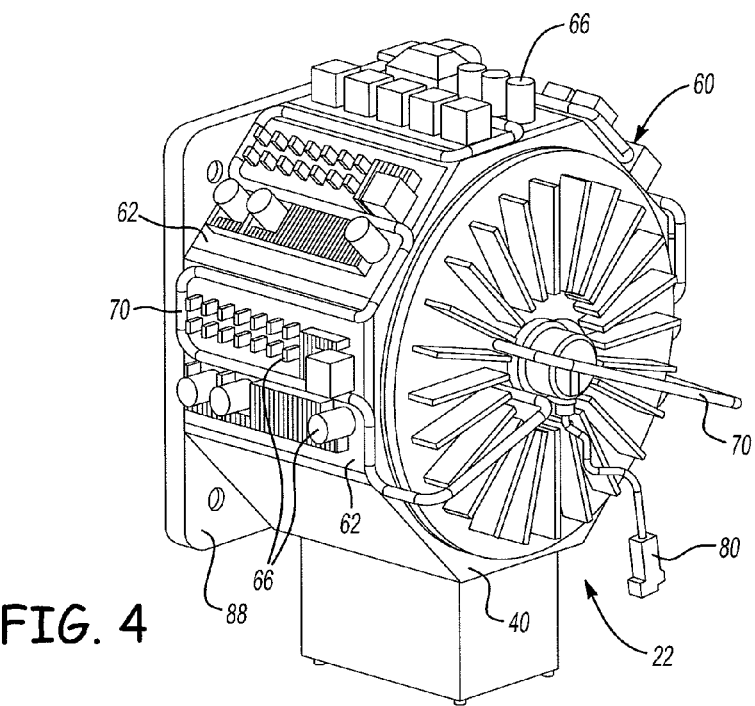
FIG. 4 is a perspective illustration diagrammatically showing another example elevator motor and drive arrangement.
Figure 5:
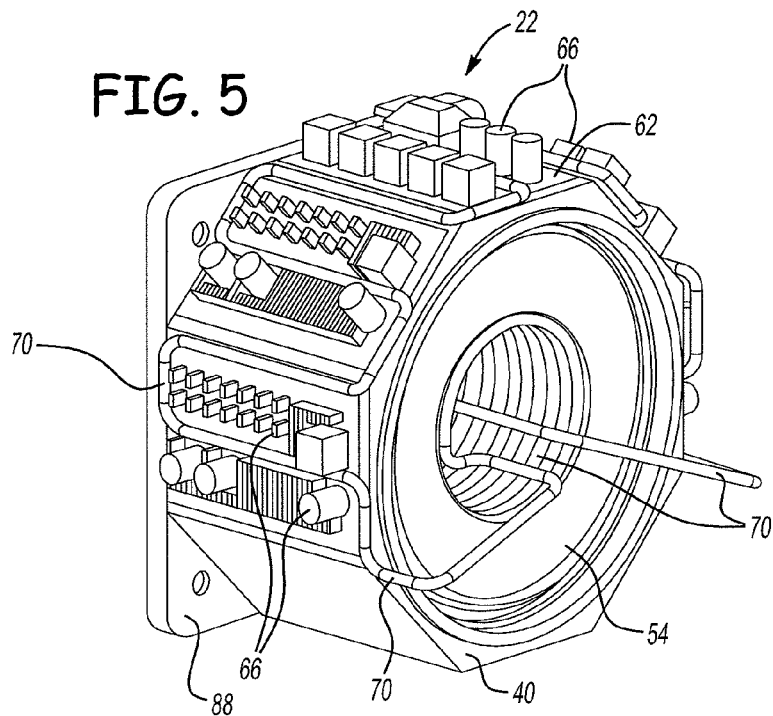
FIG. 5 shows selected portions of the example of FIG. 4.

Referring to FIGS. 4 and 5, another example arrangement is shown including a different drive support structure compared to that in the example of FIGS. 2 and 3. In this example, a plurality of boards 62 support electronic components 66 of the drive 32. Each of the boards 62 in this example are received against an exterior surface of the example motor case 40. As best appreciated from FIG. 5, the cooling circuit 70 in this example includes some conduit that is positioned at least partially within a central portion of the motor 30 such that electroconductive fluid within the cooling circuit 70 is pumped by the electric field of the motor 30. Additionally, the presence of the cooling circuit 70 within the motor 30 provides cooling to the motor 30 during operation along with providing cooling to the drive 32. This example includes an integrated cooling function for the motor and the drive from a single cooling circuit 70. This further reduces the complexity of the installation and provides cost savings by reducing the number of separate components required for the machine assembly. Additionally, having a single cooling source for the motor 30 and drive 32 reduces required space, which has economic benefits.

One feature of the illustrated examples is that it reduces the amount of wiring connections required external of the location of the motor 30 and drive 32. In the example of FIG. 4, a single connector 80 allows for making a connection with the motor and drive portion 22 to provide power from a power source and to allow for signal communication between the drive 32 and an elevator controller (not illustrated) that is responsible for determining the desired position and motion profile of the elevator car 14. Reducing the amount of wired connections that must be installed at the location of the elevator system further reduces the complexity and cost associated with installing an elevator system.

Figure 6:
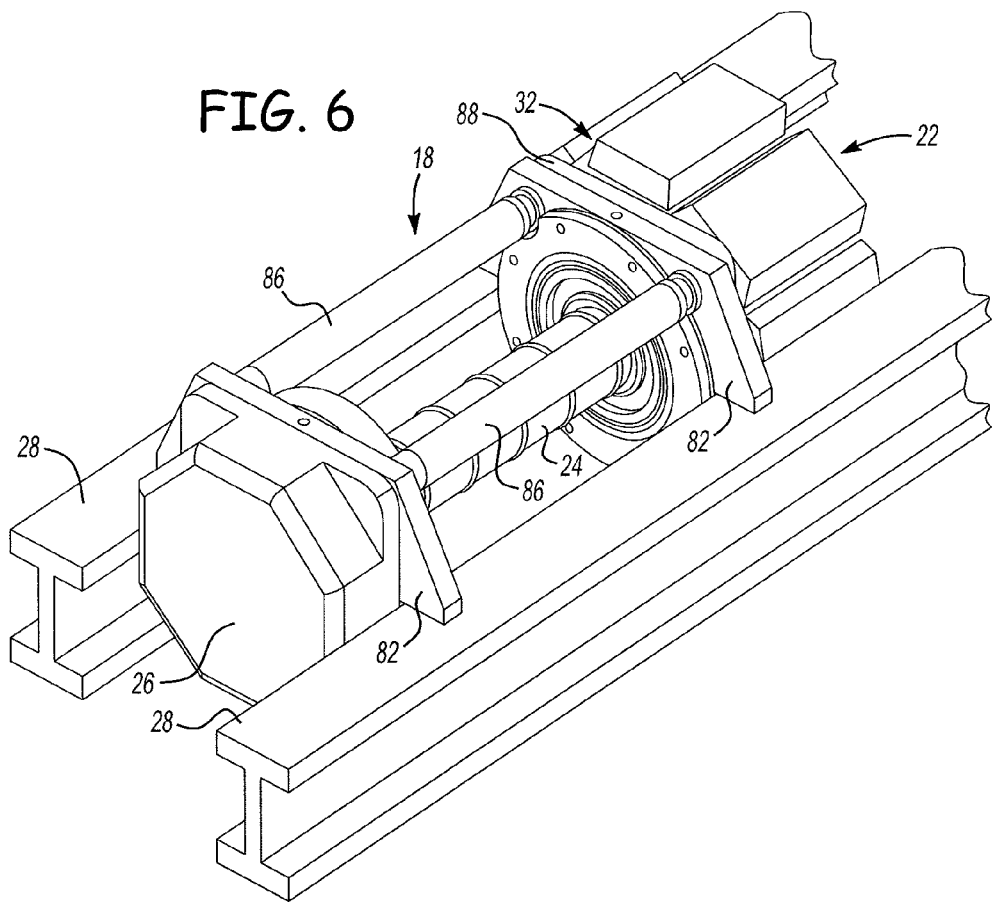
FIG. 6 diagrammatically illustrates an elevator machine assembly including a motor and drive consistent with the example of FIG. 4.

FIG. 6 illustrates the example of FIGS. 4 and 5 associated with an example machine frame 20. In this example, the frame 20 includes a plurality of support plates 82 and connecting rods 86 extending between the support plates 82. In this example, the frame 20 supports the motor and drive portion 22, traction sheave 24 and brake portion 26. The support plates 82 facilitate mounting the machine assembly onto an appropriate support structure 28 within a hoistway or in a machine room as may be needed. One feature of the illustrated example is that it facilitates positioning the machine assembly within an elevator hoistway for elevator machine roomless installations. The example machine frame 20 is only one example and those skilled in the art who have the benefit of this description will realize what other frame configurations can be used with the other features of the disclosed examples.

The example motor case 40 includes a mounting flange 88 that is secured to one of the support plates 82. The association between the motor case 40 and the support plate 82 and the position of the support plate 82 against the supporting structural member 28, provides a thermally conductive path for dissipating heat from the motor 30 and drive 32. In the example of FIG. 1, the structural member 28 and the guide rail 16 along with the frame 20 act as a heat sink for dissipating heat away from the motor 30 and drive 32. Accordingly, the illustrated examples provide a convenient way of maintaining a desired temperature of the motor 30 and drive 32 during operation. Additionally, the traction sheave 24 comprises a metal that can dissipate heat for cooling the drive 32 and the motor 30. Having the drive 32 and motor 30 at the same location allows for using the same components for cooling both of them rather than requiring separate cooling arrangements for each.

Figure 7:
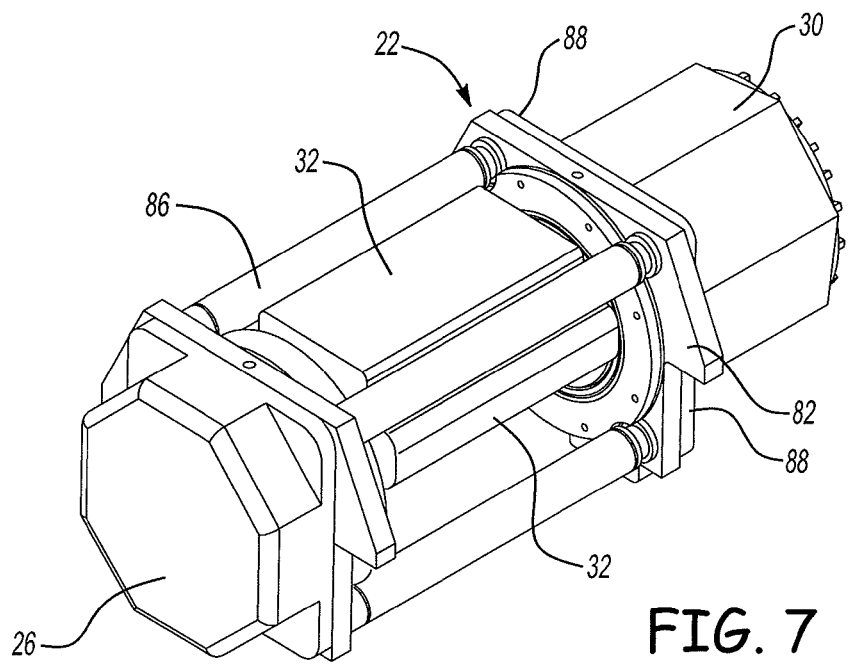
FIG. 7 shows another example configuration.
Figure 8:
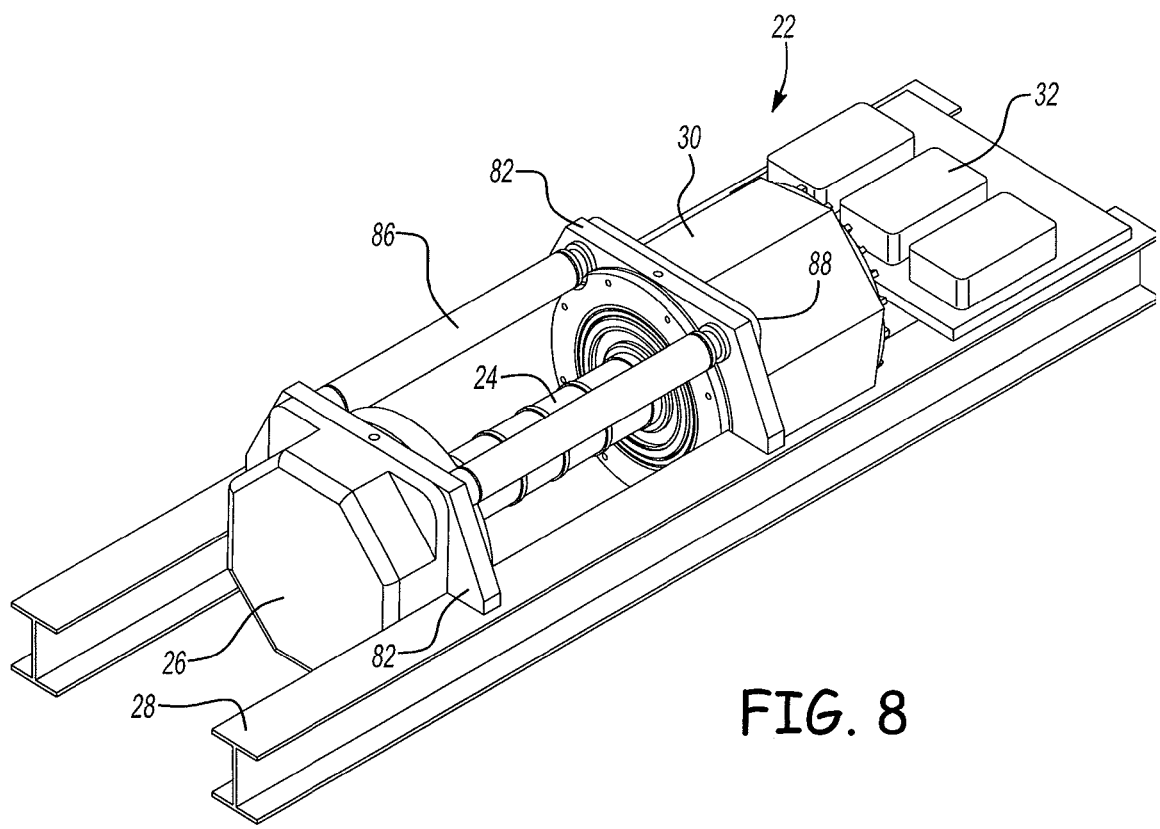
FIG. 8 shows another example configuration.
Figure 9:
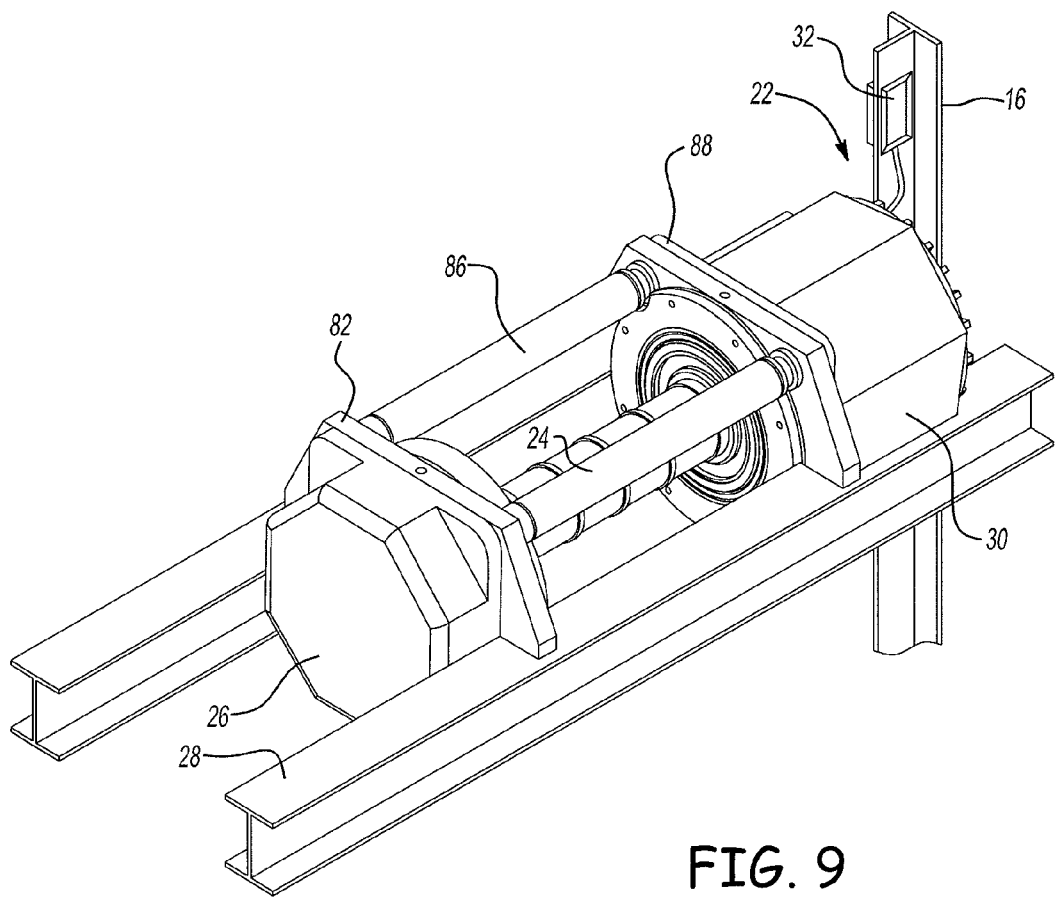
FIG. 9 shows another example configuration.

The drive 32 may be located with the motor 30 by supporting portions of the drive 32 on a case 40 of the motor as shown in FIG. 6, for example. In an alternative example as shown in FIG. 7, the drive 32 is supported at the location of the motor 30 without having the drive 32 supported by any portion of the motor 30. In the example of FIG. 7, the drive support structure is mounted to a portion of the frame 20 adjacent the traction sheave 24 (not visible in FIG. 7). In another example as shown in FIG. 8, the drive 32 is supported directly by a structural member 28 that also supports the machine frame 20. Another example is shown in FIG. 9 where the drive 32 is supported directly by a guide rail 16.

Given this description, those skilled in the art will realize how best to situate the motor 30 and drive 32 to realize the features of the disclosed examples such as integrating multiple components to avoid stand alone components that make up the elevator machine assembly, utilizing various structures associated with the machine assembly to provide cooling to the motor and drive (e.g., the machine frame, supporting structure or guide rails) and simplification of the installation process.

Figure 10:
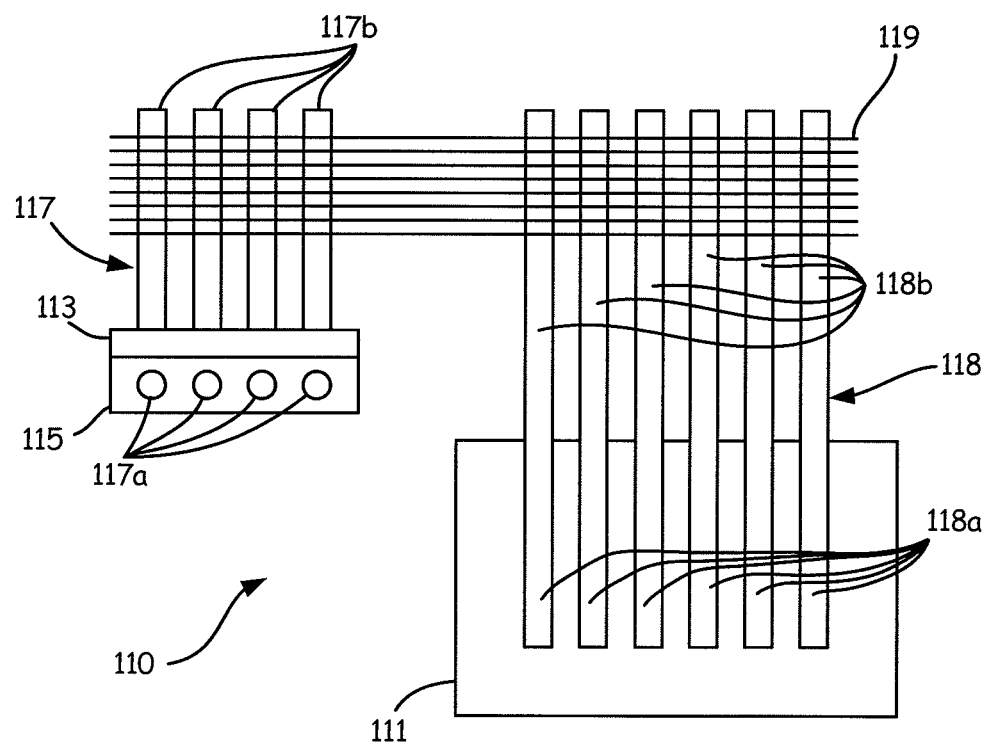
FIG. 10 is a schematic view of one embodiment of the invention.

In FIG. 10, an elevator drive system 110 including a motor 111 and drive 113 is shown. In order to operate efficiently and reliably, the heat generated by operation of motor 111 and drive 113 must be dissipated with minimal energy cost and noise. Reliability should be maximized, and motor size should be minimized.

While any motor used in an elevator drive system is within the scope of this invention, many modern elevators use a permanent magnet brushless motor. Only the stator has a winding with resistive losses that generate heat to be removed.

Drive 113 is the component of the elevator system that converts power from the power bus, not shown, to a frequency and voltage that is suitable to drive the motor 111. It is within the scope of this invention to remove heat generated by motor 111 or drive 113, or both, or by any one or more components of the elevator drive system. The elevator drive system of this invention is conventional, except for the cooling apparatus of this invention that eliminates fans and other expensive, noisy and inefficient elements.

Drive 113 is shown with an aluminum mounting bracket 115 that supports heat pipes 117, such that a first portion 117a is in contact with drive 113 to receive heat by contact and a second portion 117b is used to dissipate heat into heat exchanger 119. Heat pipes 117 are curved in a generally L-shape, but any configuration is suitable as long as the first portion 117a makes adequate heat transfer contact. Attached to motor 111 are heat pipes 118 that include a first portion 118a for receiving heat from motor 111, by conduction as shown here, and moving the heat to a second portion 118b that releases heat into heat exchanger 119.

Figure 11:
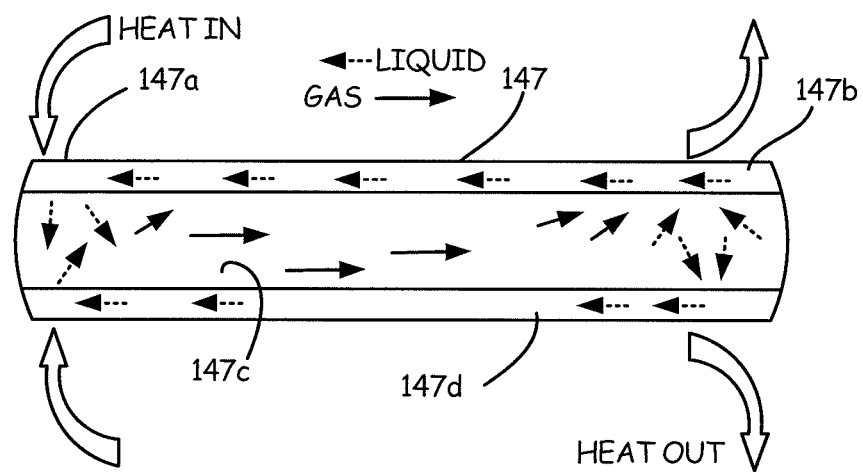
FIG. 11 is a schematic view of a heat pipe.

A heat pipe is a heat transfer mechanism that can transport large quantities of heat with a very small difference in temperature between the hotter and colder interfaces. In FIG. 11, inside a heat pipe 147, at the hot interface 147a, the fluid turns to vapor 147c shown flowing from left to right in FIG. 11. The gas 147c naturally flows and condenses as liquid 147d on the cool interface 147b. The liquid falls or is moved by capillary action back to the hot interface from right to left in FIG. 11 to evaporate again and repeat the cycle. A typical heat pipe consists of a sealed hollow tube. A heat-conductive metal like copper or aluminum is used to make the tube. The pipe contains a relatively small quantity of a "working fluid" or coolant (such as water, ethanol or mercury) in liquid phase with the remainder of the pipe being filled with vapor phase of the working fluid, all other gases being excluded.

On the internal side of the tube's sidewalls, a wick structure exerts a capillary force on the liquid phase of the working fluid. This is typically a sintered metal powder or a series of grooves parallel to the tube axis, but it may in principle be any material capable of exerting capillary pressure on the condensed liquid to drive it back to the heated end. If the heat pipe has a continual slope with the heated end down, no inner lining is needed. The working fluid simply flows back down the pipe. This simple type of heat pipe is known as a thermosyphone. Any form of heat pipe can be used, including thermosyphones that only work in a vertical direction. The advantage of heat pipes is their great efficiency in transferring heat. For example, they are a better heat conductor than an equivalent cross-section of solid copper. In addition, heat pipes can transfer heat without the need for mechanical moving parts, motors or other sources of noise.

Also, more advanced heat pipes may be used that are solid state devices such as those using nanoparticles. Examples of such a device are described in U.S. Patent Application Ser. No. 11/852,840, filed Jan. 12, 2007, which is incorporated by reference. Alternatively, mechanical equivalents to heat pipes, such as tubes using a pump to transfer a fluid, may be used.

Figure 12:
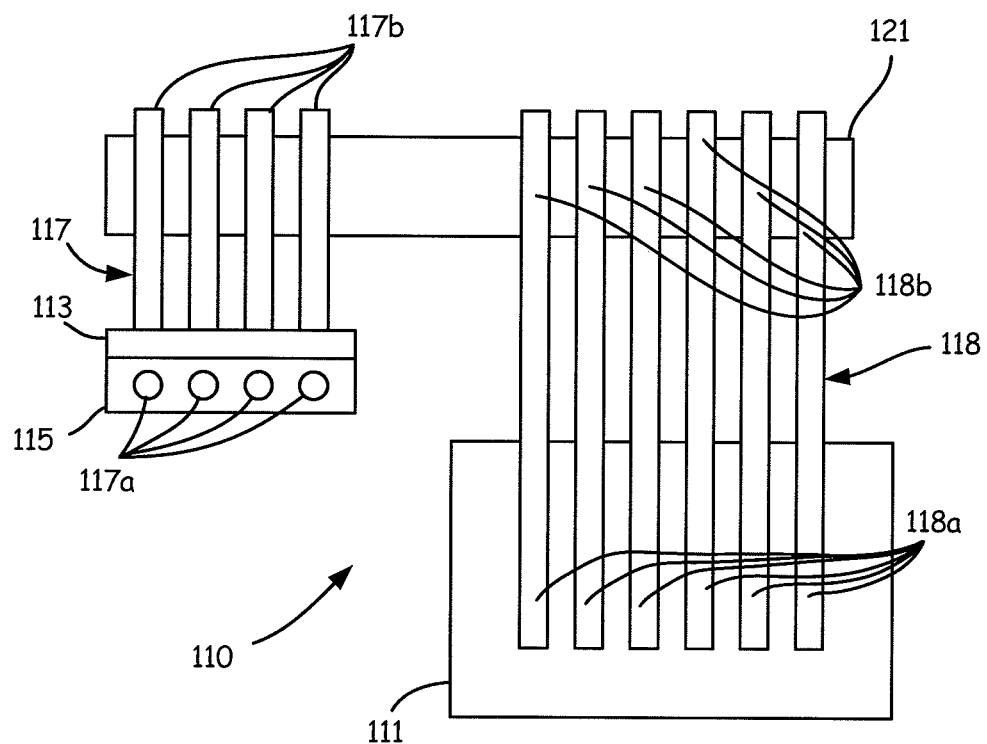
FIG. 12 is a schematic view of an alternative embodiment of the invention.
Figure 13A:
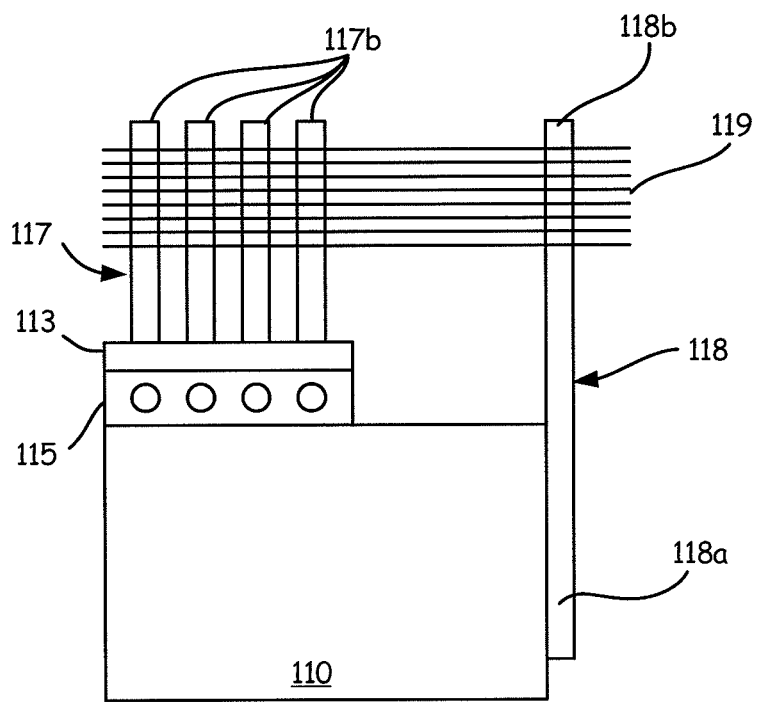
FIG. 13A is a schematic view of another embodiment of the invention.
Figure 13B:
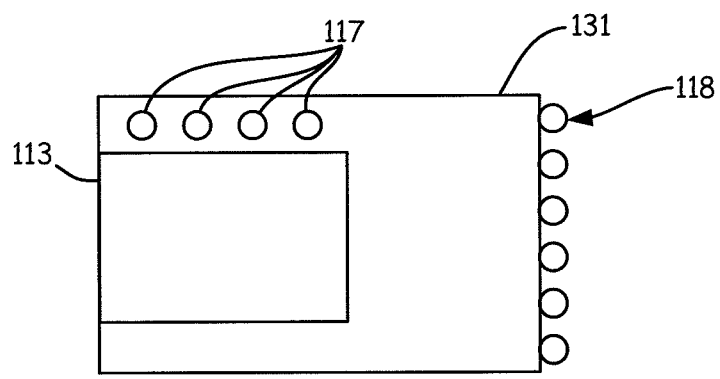
FIG. 13B is a plan view of the embodiment shown in FIG. 13A.
Figure 14A:
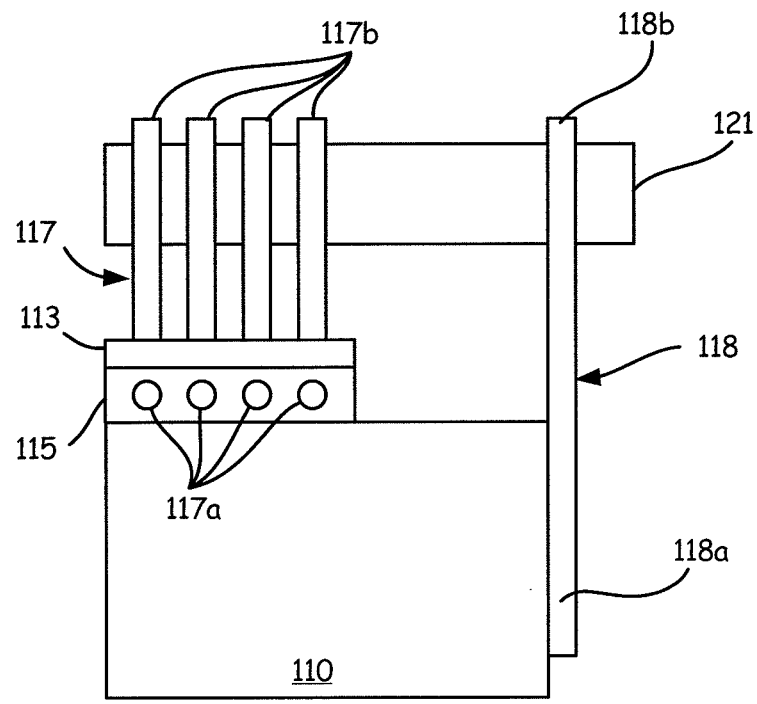
FIG. 14A is a schematic view of yet another embodiment of the invention.
Figure 14B:
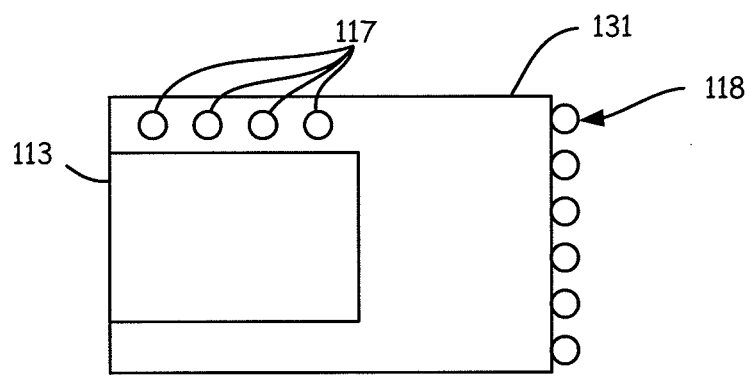
FIG. 14B is a plan view of the embodiment shown in FIG. 14A.

In FIG. 12, the second portions 117b and 118b are shown in contact with structural elements 121, such as machine surfaces, hoistway metal frames, elevator rails and the like. The advantage of this design is that the cost of a heat exchanger (such as heat exchanger 19 in FIG. 10) is eliminated, and existing structure that needs to be present is used to carry away the heat, without noise and without any issues of reliability.

FIGS. 13A, 13B and 14A, 14B illustrate a second form of motor and drive combination 131, in which the motor 133 and drive 135 are integral. The advantage of an integrated motor and drive is that it provides a significant cost reduction and increase of machine reliability by eliminating the connecting power cables that are used in older elevator systems. Again heat pipes 117 and 118 conduct heat from first portions 117a and 118a to second portions 117b and 118b to interact with heat exchanger 119 in FIGS. 13A and 13B and structural elements 121 in FIGS. 14A and 14B.

Figure 15:
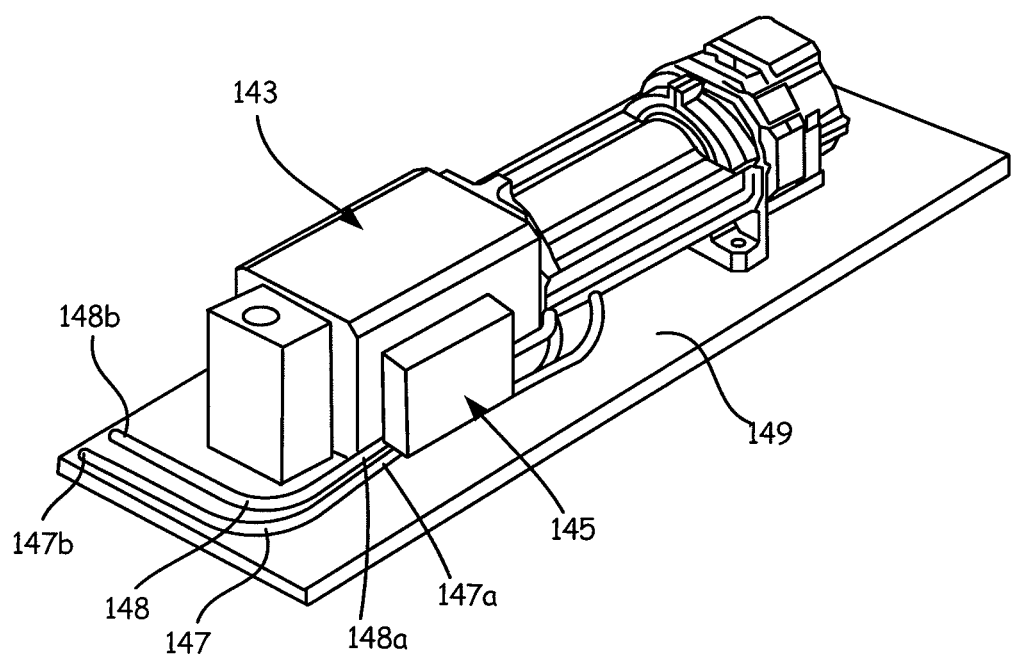
FIG. 15 is a perspective view of another embodiment of the invention.

FIG. 15 illustrates an application of the present invention where part of the structure supporting the motor 143 and drive 145 (that are integrated in a manner similar to FIGS. 13A, 13B, 14A and 14B) acts as a heat exchanger. Heat pipes 147 and 148 have first portions 147a and 148a receiving heat from motor 143 and drive 145. These heat pipes 147 and 148 have a second portion 147b and 148b that transfer heat away and into contact with the bedplate 149 that supports the elevator drive system including motor 143 and drive 145.

Figure 16:
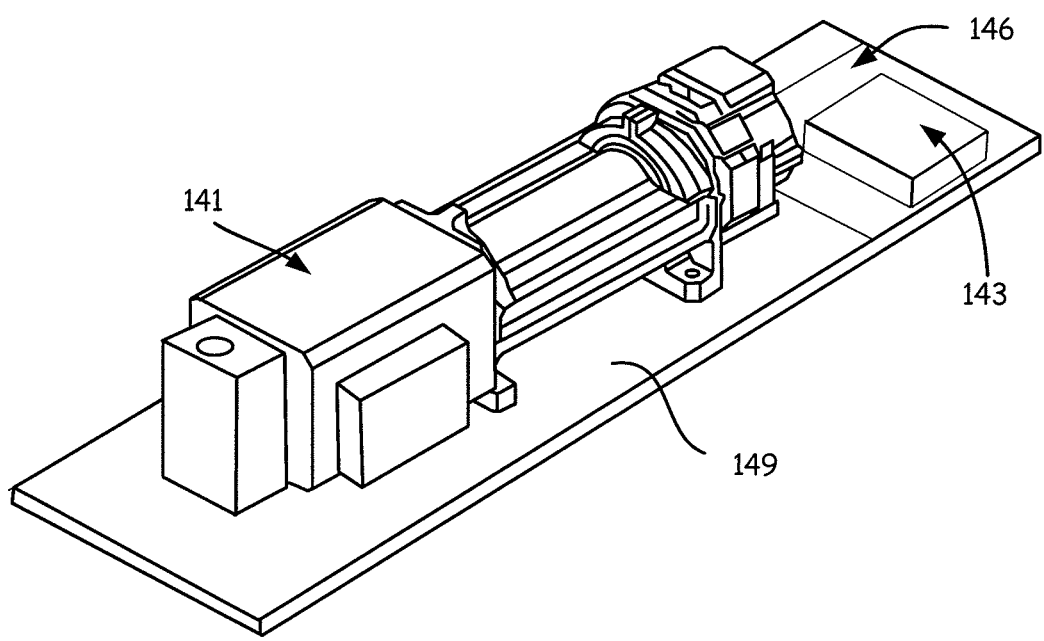
FIG. 16 is a perspective view of yet another embodiment of the invention.

FIG. 16 illustrates the use of a heat spreader instead of a heat pipe system as shown in FIG. 15. In FIG. 16, the motor 141 and drive 143 are separately mounted on bedplate 149 and a heat spreader 146 is placed between the drive 143 and bedplate 149. While some structures such as those made of thick aluminum, for example, could directly spread the high flux of heat generated by power electronics such as in drive 143, it has been found that an intermediate heat spreading structure such as heat spreader 146 spreads the heat flux over a larger area. Unlike typical extruded fin heat sink materials in conventional cooling designs, inexpensive plate stock can be used as spreader 146 to spread more of the heat onto bedplate 149. Heat spreaders are solid materials with high conductivity, usually made from aluminum or copper. In addition to solid materials forming heat spreaders 146, a form of heat pipe can be used, where a flat surface has an internal liquid to vapor structure like that of heat pipe 147 in FIG. 11.

Figure 17:
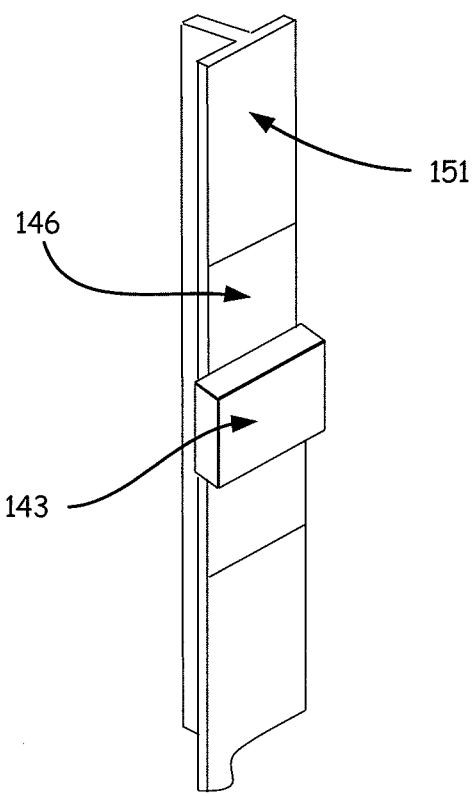
FIG. 17 is a variation of the embodiment of FIG. 16.

FIG. 17 illustrates the mounting of the drive 145 on a heat spreader 146 which in turn is mounted to elevator counterweight rail 151, or other structure, again to increase spreading of heat using a more heat conductive material such as aluminum or copper in heat spreader 146, rather than a typical material such as iron that elevator counterweight rails 151 require for added strength.

FIGS. 18A and 18B illustrate a combination of a heat spreader 146 mounting drive 145 on bedplate 49 and heat pipes 147 which further pull heat from the drive 145 through the heat spreader 146 through bedplate 149 and away from the portion of the heat pipe 147 closest to heat spreader 46 to the portion furthest away. FIG. 18B shows the relationship of the drive 145 on heat spreader 146 on one side of elevator rail 151 with heat pipes 147 on the other side of elevator counterweight rail 151. Again, heat is conducted from the portion of the heat pipe closest to the spreader to a portion remote from the drive 145.

FIGS. 19A and 19B illustrate a motor 143 and drive 145 with a pair of heat pipes 147, one of which is on each side of motor 143 and conducts heat from the motor 143 and drive 145 to a part 151 of motor 143 that is substantially cooler.

Figure 20:
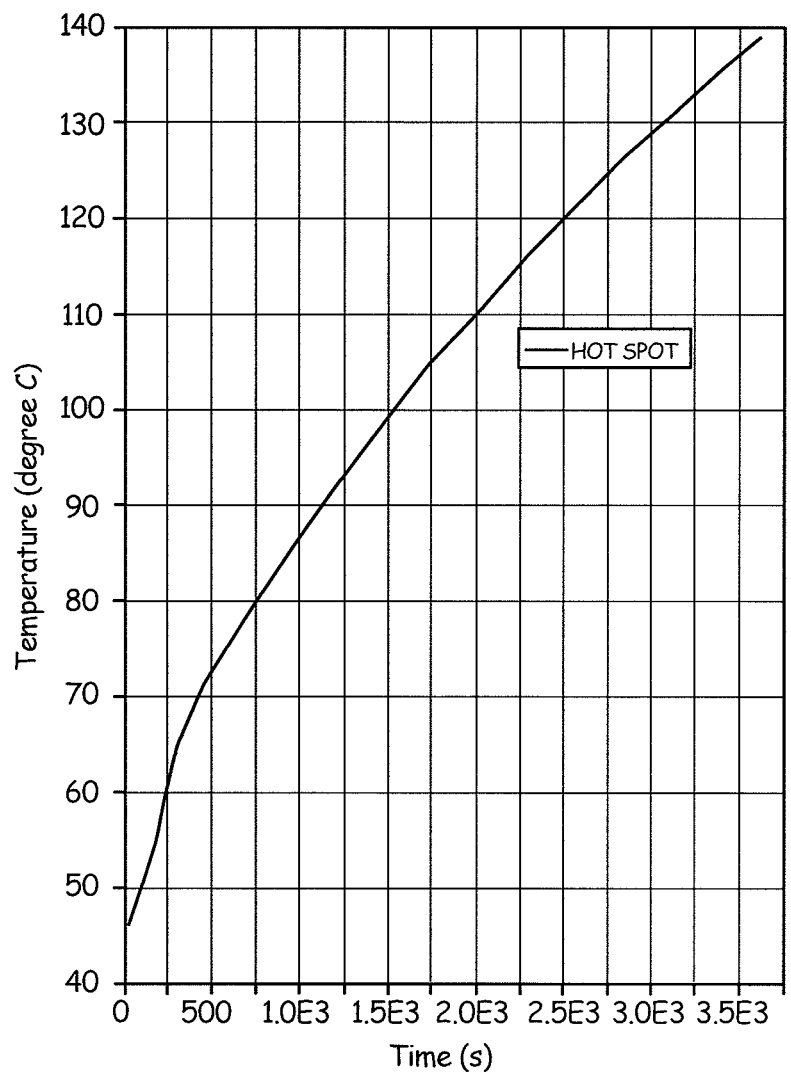
FIG. 20 is a graph showing the rise in temperature without the embodiment of FIG. 10.
Figure 21:
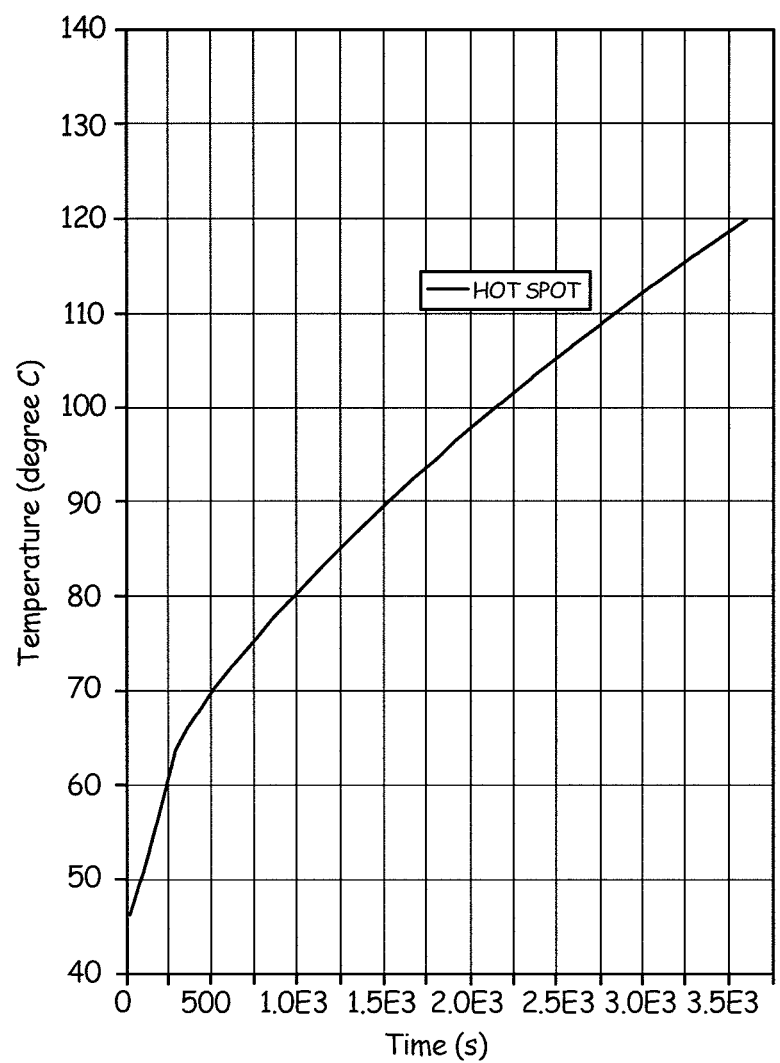
FIG. 21 is a graph showing the improvement in the rise in temperature with the embodiment of FIG. 10.

When the heat distribution is not effective, such as, for example, without both heat pipes 147 and 148 in FIG. 15, or if heat spreader 146 in FIG. 16 is not as large as shown, the device will experience hot spots. FIG. 20 is a graph illustrating the temperature of a hot spot as the motor 143 of FIG. 19A is operated without the heat pipes 147. As can be seen, the temperature increases over time to a temperature well above the maximum allowable temperature of 125° C. In contrast, FIG. 21 is a graph illustrating the temperature of the same hot spot over time with heat pipes 147 conducting heat to part 151, and where the maximum allowable temperature of 125° C. is not reached, thus significantly improving operation of the elevator system.

Although the present invention has been described with reference to preferred embodiments, workers skilled in the art will recognize that changes may be made in form and detail without departing from the spirit and scope of the invention.

The invention claimed is:

1. Apparatus for reducing heat in a drive system of an elevator including a motor and a drive for providing a source of power for the motor, the apparatus comprising:
   at least one heat conducting element in heat exchanging contact with at least one component of the drive system, the at least one heat conducting element having a first portion for receiving heat from the at least one component of the drive system;
   the at least one heat conducting element being adapted to transfer heat from the first portion to a second portion spaced from the first portion; and
   a heat exchange device proximate the second portion of the at least one heat conducting element for withdrawing heat from the second portion without the use of a fan to cool the at least one component of the drive system;
   wherein the heat exchange device is a structural support element of the elevator separate from the motor and the drive that is adapted to exchange heat from the second portion of the at least one heat conducting element at a location spaced from the motor and the drive
   wherein the structural support element is a bedplate that structurally supports the motor.

2. The apparatus of claim 1, wherein the drive system is an elevator drive system.

3. The apparatus of claim 1, wherein the motor and the drive are separated from each other in space, and wherein each of the motor and the drive have at least one heat conducting element in heat exchanging contact therewith.

4. The apparatus of claim 1, wherein the motor and the drive are integrated to provide a unitary device for contact with the at least one heat conducting element.

5. The apparatus of claim 1, wherein the at least one heat conducting element is selected from at least one heat pipe and at least one heat spreader element.

6. The apparatus of claim 1, wherein the at least one heat conducting element is selected from at least one of (a) a plurality of thermosyphones, (b) a plurality of heat pipes formed from hollow metal pipes having the first portion for receiving heat from the at least one component of the elevator drive system and the second portion for delivering heat to the heat exchanger device, the heat pipes having liquid-vapor with a two phase mixture and a capillary structure for liquid delivery from the first portion of the pipe to the second portion of the pipe, and (c) a plurality of pipes using nanoparticles to transfer heat from the first portion to the second portion proximate the heat exchange device.

* * * * *